US012179591B2

(12) United States Patent
Kunze et al.

(10) Patent No.: US 12,179,591 B2
(45) Date of Patent: Dec. 31, 2024

(54) METHOD FOR DEPICTING A VIRTUAL ELEMENT

(71) Applicant: Volkswagen Aktiengesellschaft, Wolfsburg (DE)

(72) Inventors: Alexander Kunze, Berlin (DE); Johanna Sandbrink, Braunschweig (DE); Vitalij Sadovitch, Braunschweig (DE); Michael Wittkämper, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 525 days.

(21) Appl. No.: 17/469,177

(22) Filed: Sep. 8, 2021

(65) Prior Publication Data
US 2022/0072957 A1    Mar. 10, 2022

(30) Foreign Application Priority Data

Sep. 9, 2020    (DE) ............... 10 2020 211 298.3

(51) Int. Cl.
*B60K 35/00*    (2024.01)
*B60K 35/23*    (2024.01)
(Continued)

(52) U.S. Cl.
CPC .......... *B60K 35/00* (2013.01); *G02B 27/0101* (2013.01); *B60K 35/23* (2024.01);
(Continued)

(58) Field of Classification Search
None
See application file for complete search history.

(56) References Cited

U.S. PATENT DOCUMENTS 7,952,808 B2 *    5/2011    Hotta ............... G02B 27/01
                                                    340/425.5
11,193,785 B2 *    12/2021    Kimura .............. G01C 21/365
(Continued)

FOREIGN PATENT DOCUMENTS

CN    104253990 A    12/2014    ............. B60R 1/00
DE    102015225343 A1    6/2017    ............. B60K 35/00
(Continued)

OTHER PUBLICATIONS https://www.intelli-vision.com/smart-auto-adas-telematics/ logged on Aug. 4, 2020 (Year: 2020).*
(Continued)

*Primary Examiner* — James J Lee
*Assistant Examiner* — David Hatch
(74) *Attorney, Agent, or Firm* — Slayden Grubert Beard PLLC

(57) ABSTRACT

The invention relates to a method for depicting at least one virtual element in a display area of at least one display element of a vehicle. The method for depicting a virtual element allows the depth perception of virtual elements in the display area of a display apparatus to be improved. The method may be realized in that the virtual element is constructed of at least one first virtual subelement and one second virtual subelement, wherein the first virtual subelement is arranged in perspective in the display area in front of the second subelement.

11 Claims, 2 Drawing Sheets

(51) Int. Cl.
    *B60K 35/28*     (2024.01)
    *G02B 27/01*     (2006.01)

(52) U.S. Cl.
    CPC ........ *B60K 35/28* (2024.01); *B60K 2360/177* (2024.01); *B60K 2360/31* (2024.01); *G02B 2027/0127* (2013.01)

(56) References Cited

U.S. PATENT DOCUMENTS

| | | | |
|---|---|---|---|
| 11,493,357 B2 * | 11/2022 | Kawai | G01C 21/3632 |
| 2010/0153000 A1 | 6/2010 | Akita et al. | 701/429 |
| 2011/0102303 A1 | 5/2011 | Kakizaki et al. | 345/7 |
| 2012/0224062 A1 * | 9/2012 | Lacoste | G09G 5/14 |
| | | | 348/148 |
| 2018/0157037 A1 | 6/2018 | Kasazumi et al. | |
| 2019/0018250 A1 | 1/2019 | Kasazumi et al. | |
| 2019/0049724 A1 | 2/2019 | Kimura et al. | |
| 2019/0248287 A1 | 8/2019 | Ono et al. | |
| 2019/0317326 A1 | 10/2019 | Meijering et al. | |
| 2020/0143569 A1 | 5/2020 | Masuya et al. | |
| 2020/0393263 A1 | 12/2020 | Kleen et al. | |
| 2021/0223058 A1 * | 7/2021 | Horihata | G01C 21/3635 |
| 2021/0260999 A1 | 8/2021 | Masuya et al. | |

FOREIGN PATENT DOCUMENTS

| | | | |
|---|---|---|---|
| DE | 102018203462 A1 | 9/2019 | G01C 21/36 |
| DE | 112017006054 T5 | 9/2019 | G02B 27/01 |
| JP | 2010121704 A | 6/2010 | F16B 2/08 |
| JP | 2019138773 A | 8/2019 | B60K 35/00 |
| JP | 2020121704 A | 8/2020 | B60K 35/00 |
| WO | 2019/188581 A1 | 10/2019 | B60K 35/00 |
| WO | 2019/189515 A1 | 10/2019 | G01C 21/36 |
| WO | 2020/009219 A1 | 1/2020 | B60K 35/00 |

OTHER PUBLICATIONS

German Office Action, Application No. 102020211298.3, 5 pages.
Chinese Office Action, Application No. 202111055355.7, 15 pages.

* cited by examiner

METHOD FOR DEPICTING A VIRTUAL ELEMENT

CROSS-REFERENCE TO RELATED APPLICATIONS

This application claims priority to German Patent Application DE 10 2020 211 298.3, filed on Sep. 9, 2020 with the German Patent and Trademark Office. The contents of the aforesaid Patent Application are incorporated herein for all purposes.

TECHNICAL FIELD

The invention relates to a method for depicting at least one virtual element in a display area of at least one display apparatus of a vehicle. In addition, the invention relates to a device for depicting at least one virtual element with at least one display apparatus with at least one display area. Moreover, the invention relates to vehicle with a device for depicting at least one virtual element.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

With the continuous development of virtual and augmented reality technologies and applications, these are also finding their way into automobiles. Augmented reality (AR) involves the enrichment of the real world by virtual elements that are registered, or respectively located at the correct location in three-dimensional space and permit real-time interaction. One possible technical realization for correspondingly enriching the driver's workplace with virtual augmentations in correct perspective is head-up display (HUD).

Particularly with head-up displays, the virtual display arises from an imaging unit integrated in the dashboard such as a TFT display. This image is directed by several mirrors toward the windshield where the light is reflected into the eye of the driver. The driver perceives this image as a virtual display in the field of vision. When designing such systems, the area in which the light is reflected is spatially limited in order to achieve greater brightness by reduced light scatter. This area is termed the "eyebox" since the field of vision of the driver must be within this area to enable perception of the virtual image.

A significant issue of head-up displays is that virtual 3D elements that are located in a three-dimensional space must be depicted on a two-dimensional display. Consequently, some of the virtual elements cannot be perceived as components of the environment by the viewer. A line lying on the road running forward as an extension of the environment could, given the design of the virtual image plane, partly not be perceived as lying on the roadway, but rather as vertical and running upward. This perceptual error will be termed the ramp effect in the following. In order to reduce the ramp effect, human depth perception must be taken into account.

SUMMARY

A need exists to provide a method for displaying a virtual element, a corresponding device, as well as a vehicle in which the depth perception of virtual elements in the display area of a display apparatus is improved.

The need is addressed by the subject matter of the independent claims. Embodiments of the invention are described in the dependent claims, the following description, and the drawings.

DESCRIPTION

Figure 1:
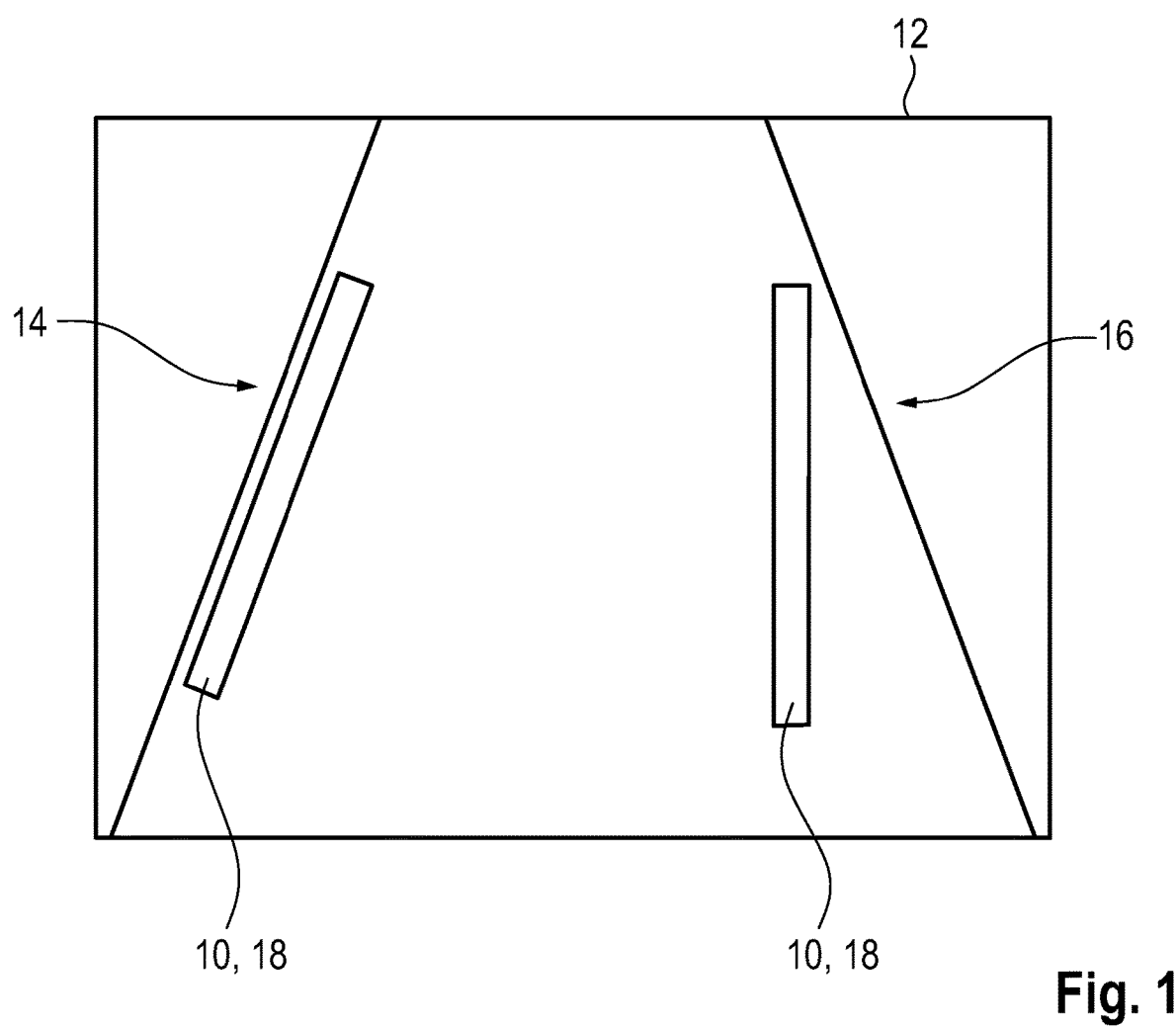
FIG. 1 schematically shows a typical depiction of a contact-analog virtual element.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for displaying a virtual element is provided. The virtual element may be constructed of at least one first virtual subelement and one second virtual subelement, wherein the first virtual subelement is arranged in perspective in the display area in front of the second subelement.

The display area of the display apparatus may in some embodiments be a display in the middle area or in the cockpit area, for example in the instrument cluster of the vehicle. Alternatively or in addition and in some embodiments, the display area of the display apparatus may be designed as a head-up display. A head-up display is to be understood as a display area in which the driver may maintain his head angle, or respectively viewing direction because the information is projected into his field of vision, for example on the windshield of the vehicle.

The depicted three-dimensional space may for example describe an area outside of the vehicle in the driving direction. In a head-up display, the display area of the display apparatus, or respectively the three-dimensional space, is equivalent to looking through the windshield. The three-dimensional space is then consequently the space in front of the vehicle in the field of vision of the driver, or respectively the passenger. The corresponding two-dimensional coordinates calculated for the virtual element may for example be Cartesian coordinates.

The data sources needed to calculate the coordinates may differ. For example, these data sources are vehicle data, or respectively navigation data that are recorded by the position sensors of the vehicle such as for example GPS, rotation rate sensors, or cameras.

The virtual element may comprise various picture elements and/or buttons that are depicted in the display area of the display apparatus. The virtual elements may have a link to vehicle data and/or be dependent on the driving properties of the vehicle. The data may for example originate from existing driver assist systems. It is however also possible in some embodiments for the depicted virtual elements to be irrelevant to the driving properties of the vehicle.

The virtual subelements taken together yield the overall virtual element. By dividing up the virtual element, it is possible to design the subelements differently in order for the depth perception of the viewer, or respectively the driver of the vehicle, to seem as realistic as possible.

Some embodiments are provided by the dependent claims.

In some embodiments, it is provided that the first virtual subelement and the second virtual subelement are depicted with an extension of depth so that the virtual element is depicted smaller and higher in the display area of the display apparatus with increasing distance. Elements that are depicted in the background are generally smaller than elements in the foreground in a depiction with perspective. A line depicted in the display area that for example is intended to depict the edge of the roadway may therefore be depicted with perspective such that the virtual subelements by means of which this line is depicted decrease incrementally in size. The ramp effect then does not occur since it appears to the driver that the line extends into the image plane.

In some embodiments, it is provided that the first virtual subelement and the second virtual subelement have a texture gradient. For the virtual subelements, the subelements lying further in the background may thereby be provided with a different texture than the virtual subelements that lie further in the foreground. Accordingly, a more realistic depth perception may be generated.

Alternatively or in addition and in some embodiments, the first virtual subelement and the second virtual subelement have a sharpness gradient. Analogous to the above embodiments, the virtual subelements that lie further in the background may be less sharp than the virtual subelements that lie further in the foreground, which may generate a more realistic depth perception for the driver of the vehicle. Depending on the distance of the three-dimensional objects, it may also be recommendable at short distances for the objects lying further in the foreground to be less sharp than the three-dimensional objects lying further in the background. A combination of both embodiments is also possible. To accomplish this, at least three virtual subelements are needed, wherein the front virtual subelement and the rear virtual subelement are each less sharp than the middle virtual subelement.

Alternatively or in addition and in some embodiments, the first virtual element and the second virtual element have a brightness gradient. Virtual subelements that correspondingly lie further in the background may have less brightness than virtual subelements that lie further in the foreground in order to configure the depth perception for the driver of the vehicle more realistically.

In some embodiments, at least one third virtual subelement is provided. The third virtual subelement is arranged in perspective in the display area behind the second subelement. The first virtual subelement has a first distance to the second virtual subelement, wherein the second virtual subelement has a second distance to the third virtual subelement. The first distance is greater than the second distance. The further to the background the virtual subelements lie in perspective, the closer they move toward each other in order to improve the depth perception for the driver of the vehicle.

In some embodiments, the quality of the geometrically correct depiction of the virtual element is checked depending on the visual quality of the virtual element for a driver of the vehicle.

Some embodiments moreover provide that the quality of the geometrically correct depiction of the virtual element is reduced when the visual quality of the virtual element achieves a previously determined threshold. Depending on the perspective of the viewer, the correct depiction in perspective may cause distances between virtual subelements to become so small that they are no longer perceptible, and the subobjects overlap in subjective perception.

Consequently, embodiments provide that absolute geometric accuracy is forfeited for the sake of greater visual quality in such a case. In this case, this means that the distances between the subobjects are not kept constant over the entire length of the lines but rather, as the distance in three-dimensional space increases, are increased just enough for the distances to remain perceptible, and for a reduction of the distances over the entire length to also remain perceptible.

In some embodiments, a display apparatus is designed to execute a method according to the preceding or following embodiments. The above teachings regarding the method also apply to the device.

The device may for example be a navigation system that enables a graphic output of contact-analog elements.

In some embodiments, a vehicle with a device for depicting at least one virtual element is provided, wherein the device is designed according to the teachings herein. The above teachings regarding the device accordingly also apply to the vehicle.

The various embodiments of the invention mentioned in this application may be combined with one another, unless designed otherwise in individual cases.

The invention will be explained in further exemplary embodiments in the following based on the associated drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows the depiction of a virtual element 10 in the display area 12 of a display apparatus 14 as is conventional in the prior art. A three-dimensional space 16 is depicted in the display area 12 of the display apparatus 14. The display apparatus in this embodiment is a head-up display. On the basis of at least one data source, three-dimensional coordinates are determined in the depicted three-dimensional space 16 for locating at least one virtual element 10.

The virtual element 10 is then transformed as a two-dimensional image 18 into the three-dimensional space 16 that is depicted in the display area 12 of the display apparatus 14. Then the virtual element 10 in the display area 12 of the display apparatus 14 is depicted correctly in perspective in the field of vision of the driver with respect to the three-dimensional space 16. In the present example, two virtual elements 10 are displayed in the form of lines as the border of the lane.

A significant issue in the depiction of elements depicted correctly in perspective may be that virtual elements 10 that are located in a three-dimensional space 16 must be depicted on a two-dimensional display area 12. Consequently, some of the virtual elements 10 cannot be perceived as components of the environment by the viewer. Accordingly in FIG.

1, an expansion of the environment by lines lying on the road that run forward are taken into account to visualize the lane. However, given the design of the virtual image plane, some of these lines may not lie on the roadway but are instead perceived as vertical and running upward due to the ramp effect.

Figure 2:
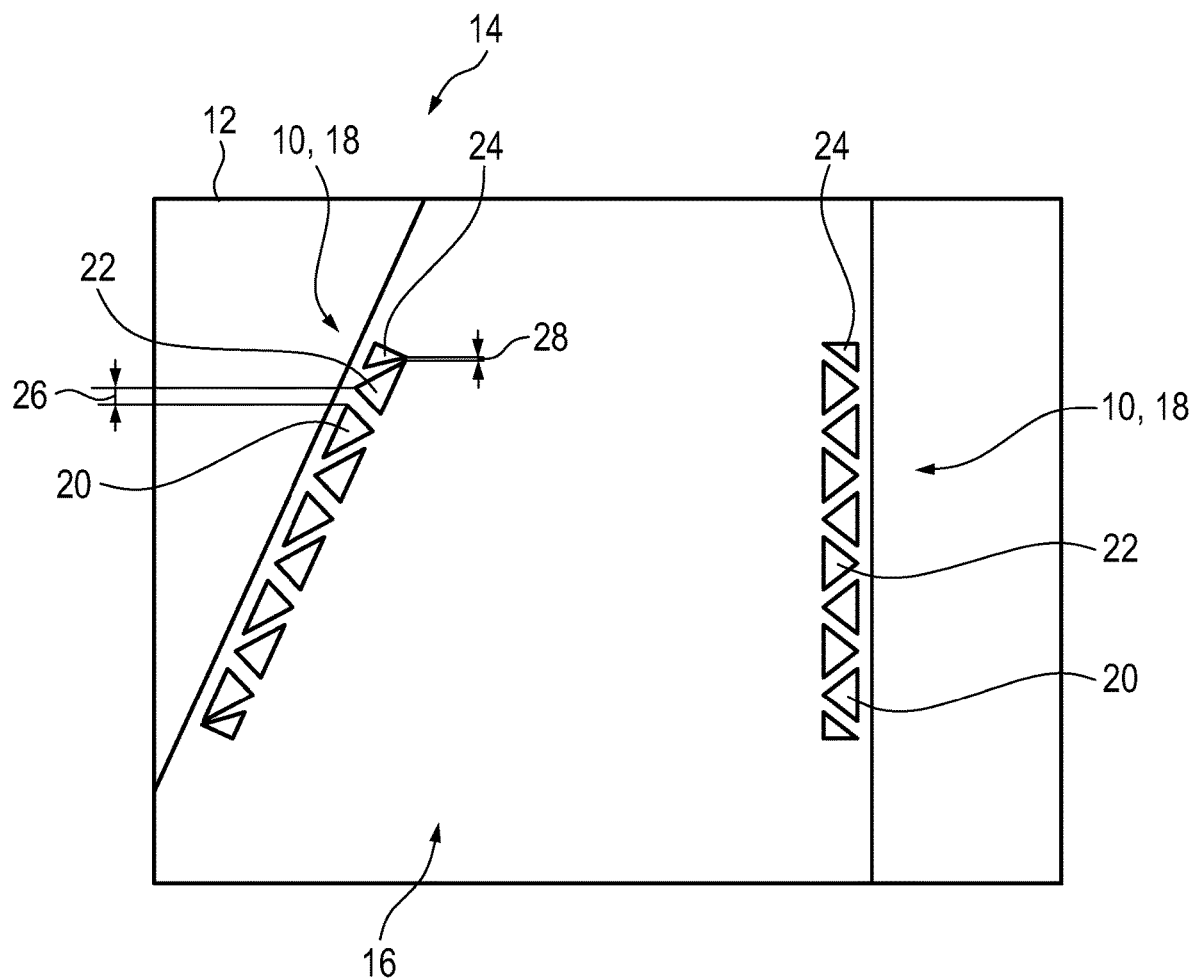
FIG. 2 schematically shows the depiction of a contact-analog virtual element according to an exemplary embodiment.

FIG. 2 shows a depiction of an exemplary embodiment of a method according to the teachings herein. In principle, an improvement of the depth perception could be realized by stereoscopic image generators. With the assistance of a stereoscopic image generator, two separate images could be generated for the two eyes. A 3D image is thereby perceived. However, the vergence-accommodation conflict occurs in stereoscopic displays that for example may lead to headaches. This effect is frequently observed for example in 3D theaters.

In FIG. 2, the virtual elements 10 are divided into virtual subelements 20, 22, 24. A first virtual subelement 20 is arranged in perspective in front of a second virtual subelement 22, wherein a third virtual subelement 24 is arranged in perspective behind the second virtual subelement 22. In the depiction, other virtual subelements are provided.

By dividing up the virtual elements 10 into virtual subelements 20, 22, 24, the virtual subelements 20, 22, 24 may for example be provided with texture gradients that make it possible to improve the depth perception of the virtual elements. In doing so, the first virtual subelement 20 has a first distance 26 to the second virtual subelement 22. The second virtual subelement 22 has a second distance 28 to the third virtual subelement 24. The first distance 26 is greater than the second distance 28. Accordingly, the distance between two virtual subelements is smaller the further these virtual subelements are arranged in perspective in the background, whereby depth perception is improved.

Depending on the perspective of the viewer, the correct depiction in perspective may however cause the distances 26, 28 between the virtual subelements to become 20, 22, 24 so small that they are no longer perceptible, and the virtual subelements 20, 22, 24 overlap in subjective perception. Consequently in this exemplary embodiment, it is provided that absolute geometric accuracy is forfeited for the sake of greater visual quality in such a case. In this case, this means that the distances 26, 28 between the subobjects are not kept constant over the entire length of the lines but rather, as distance in three-dimensional space 16 increases, are increased just enough for the distances 26, 28 to remain perceptible, and for a reduction of the distances 26, 28 over the entire length to also remain perceptible.

In addition, it may be provided in this exemplary embodiment that the virtual subelements 20, 24, 28 and/or the virtual element 10 as a whole has an extension of depth so that the virtual element 10 may be depicted smaller and higher with increasing distance in the display area 12 of the display apparatus 14. In addition, it may be provided that the virtual subelements 20, 24, 28 and/or the virtual element 10 as a whole are provided with a sharpness gradient that makes it possible to depict the virtual elements 10 more diffusely the more distant they are in perspective. In addition it may be provided that the virtual subelements 20, 24, 28 and/or the virtual element 10 as a whole have a brightness gradient that makes it possible to depict the virtual elements 10 darker the more distant they are in perspective.

LIST OF REFERENCE NUMERALS

10 Virtual element
12 Display area
14 Display apparatus
16 Three-dimensional space
18 Two-dimensional image
20 First virtual subelement
22 Second virtual subelement
24 Third virtual subelement
26 First distance
28 Second distance The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for depicting at least one virtual element in a display area of at least one display apparatus of a vehicle, wherein a three-dimensional space is depicted in the display area of the display apparatus, comprising:
    determining, based on at least one data source, three-dimensional coordinates in the depicted three-dimensional space for locating at least one virtual element;
    transforming the at least one virtual element as a two-dimensional depiction into the three-dimensional space that is depicted in the display area of the display apparatus in the form of a border of a lane; and
    depicting the at least one virtual element in the display area of the display apparatus in perspective in the field of vision of the driver with respect to the three-dimensional space; wherein
    the virtual element is constructed of at least one first virtual subelement, one second virtual subelement, and at least one third virtual subelement; wherein
    the first virtual subelement is arranged in perspective in the display area in front of the second subelement;
    the third virtual subelement is arranged in perspective in the display area behind the second virtual subelement;
    the first virtual subelement has a first distance to the second virtual subelement; the second virtual subelement has a second distance to the third virtual subelement;
    the first distance is greater than the second distance;
    the first virtual subelement and the second virtual subelement have a first sharpness gradient such that the first virtual subelement is less sharp than the second virtual subelement; and wherein
    the third virtual subelement and the second virtual subelement have a second sharpness gradient such that the third virtual subelement is less sharp than the second virtual subelement.

2. The method of claim 1, wherein the first virtual subelement and the second virtual subelement are depicted with an extension of depth so that the virtual element is depicted smaller and higher in the display area of the display apparatus with increasing distance.

3. The method of claim 1, wherein the first virtual subelement and the second virtual subelement have a texture gradient.

4. The method of claim 1, wherein the first virtual subelement and the second virtual subelement have a brightness gradient.

5. The method of claim 1, comprising: checking a quality of a geometrically correct depiction of the virtual element depending on a visual quality of the virtual element for a driver of the vehicle.

6. The method of claim 5, wherein the quality of the geometrically correct depiction of the virtual element is reduced when the visual quality of the virtual element achieves a previously determined threshold.

7. A device for depicting at least one virtual element with at least one display apparatus with at least one display area, wherein the display apparatus is configured to:
   determine, based on at least one data source, three-dimensional coordinates in the depicted three-dimensional space for locating at least one virtual element;
   transform the at least one virtual element as a two-dimensional depiction into the three-dimensional space that is depicted in the display area of the display apparatus in the form of a border of a lane; and
   depict the at least one virtual element in the display area of the display apparatus in perspective in the field of vision of the driver with respect to the three-dimensional space; wherein
   the virtual element is constructed of at least one first virtual subelement, one second virtual subelement, and at least one third virtual subelement; wherein the first virtual subelement is arranged in perspective in the display area in front of the second subelement;
   the third virtual subelement is arranged in perspective in the display area behind the second virtual subelement;
   the first virtual subelement has a first distance to the second virtual subelement;
   the second virtual subelement has a second distance to the third virtual subelement;
   the first distance is greater than the second distance;
   the first virtual subelement and the second virtual subelement have a first sharpness gradient such that the first virtual subelement is less sharp than the second virtual subelement;
   and wherein the third virtual subelement and the second virtual subelement have a second sharpness gradient such that the third virtual subelement is less sharp than the second virtual subelement.

8. A vehicle with a device for depicting at least one virtual element, wherein the device is configured according to claim 7.

9. The method of claim 2, wherein the first virtual subelement and the second virtual subelement have a texture gradient.

10. The method of claim 2, wherein the first virtual subelement and the second virtual subelement have a brightness gradient.

11. The method of claim 3, wherein the first virtual subelement and the second virtual subelement have a brightness gradient.

* * * * *